(12) United States Patent  
Smith

(10) Patent No.: US 6,516,329 B1  
(45) Date of Patent: Feb. 4, 2003

(54) METHOD OF MAINTAINING SEARCH RESULTS PAGES

(75) Inventor: Kim C. Smith, Colleyville, TX (US)

(73) Assignee: Gateway, Inc., Poway, CA (US)

( * ) Notice: Subject to any disclaimer, the term of this patent is extended or adjusted under 35 U.S.C. 154(b) by 0 days.

(21) Appl. No.: 09/299,826

(22) Filed: Apr. 26, 1999

(51) Int. Cl.[7] .............................................. G06F 15/00
(52) U.S. Cl. ............................ 707/501.1; 707/3; 707/4
(58) Field of Search ................................ 707/501, 507, 707/501.1, 531, 3, 4, 5, 6

(56) References Cited

U.S. PATENT DOCUMENTS

| | | | | |
|---|---|---|---|---|
| 5,701,469 A | * | 12/1997 | Brandli et al. | 707/102 |
| 5,706,365 A | * | 1/1998 | Rangarajan et al. | 707/102 |
| 5,806,065 A | * | 9/1998 | Lomet | 707/3 |
| 5,848,410 A | * | 12/1998 | Walls et al. | 707/102 |
| 6,209,007 B1 | * | 3/2001 | Kelley et al. | 707/102 |
| 6,253,198 B1 | * | 6/2001 | Perkins | 707/10 |
| 6,278,992 B1 | * | 8/2001 | Curtis et al. | 707/3 |

* cited by examiner

*Primary Examiner*—Joseph H. Feild  
*Assistant Examiner*—Maikhanh Nguyen  
(74) *Attorney, Agent, or Firm*—Richard Gilly; Scott Charles Richardson

(57) ABSTRACT

A method, system, signal, and software program for handling search through the use of a page index. Searches are performed across a plurality of content information sources and content types. For every search that returns unique search results, the page index is updated to include links to those pages. Accessing the same page multiple times does not cause multiple entries in the page index, and no search results nor page index entries are deleted as a result of additional searches performed.

35 Claims, 8 Drawing Sheets

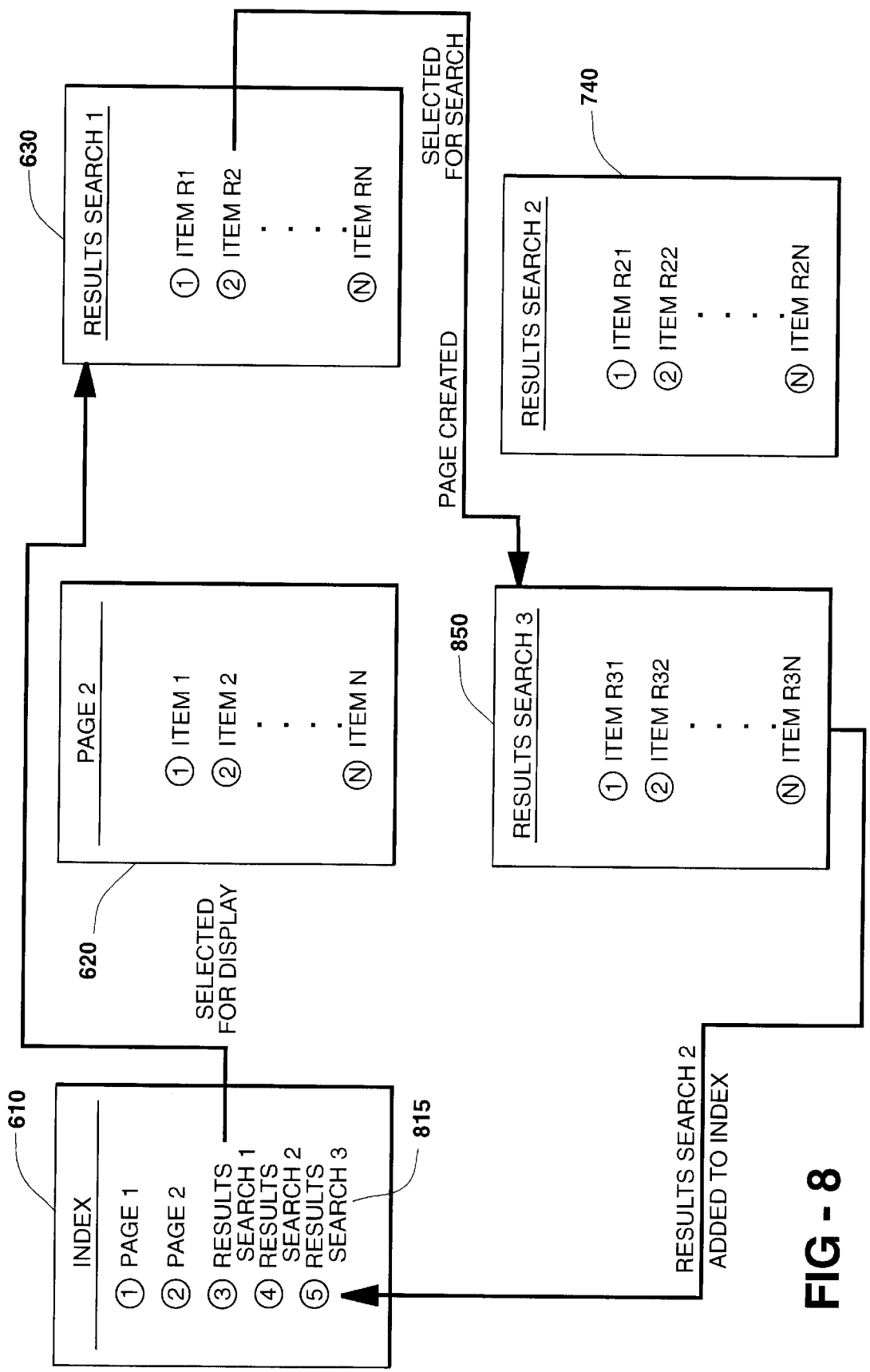

METHOD OF MAINTAINING SEARCH RESULTS PAGES

CROSS REFERENCE TO RELATED APPLICATIONS

U.S. patent application Ser. No. 09/354,052 filed of even date herewith entitled "A Method of Searching Across Media and Source Types" of common assignee herewith, pending incorporated herein by reference.

U.S. patent application Ser. No. 09/298,006 filed of even date herewith entitled "A Method of Creating Default Lists of Content of Probable Interest" of common assignee herewith, pending incorporated herein by reference.

U.S. patent application Ser. No. 09/374,781 filed of even date herewith entitled "Presenting Content Selection Options Across Media Source Types" of common assignee herewith, pending incorporated herein by reference.

U.S. patent application Ser. No. 09/298,005 filed of even date herewith entitled "system and method for providing a data base of content having like associations" of common assignee herewith, incorporated herein by reference.

FIELD OF THE INVENTION

The present invention relates generally to electronic searches and more particularly to systems, software programs, signals, and methods for handling results obtained from electronic searches.

BACKGROUND OF THE INVENTION

Electronic searches are routinely performed not only by scientists and engineers but also by people with no technical training whatsoever. It is almost as common for a high school student to perform an electronic search to find references for an English paper as it is for a scientist to perform an electronic search to find a specific piece of data within a database. In the current age of VCRs and computer games, it is even common for young children to perform electronic searches, even though the children are not aware that they are doing so.

Two electronic search mechanisms that are in widespread use today are Electronic Program Guides (EPGs) and Internet browsers. EPGs can be found in almost any home that has cable television service. In addition, EPGs are provided as standard equipment on some of the more modern television sets. These EPGs, whether implemented in a television set or a cable box, usually provide basic search and sort capabilities that allow users to obtain program information more quickly and easily than they could using a printed program guide. With the growing popularity of the worldwide web, Internet browsers are also being used more often to perform searches. Many school age children today, especially students in high school, have had some exposure to the Internet and Internet browsers. Internet browsers surpass EPGs in search sophistication by allowing a user to specify advanced search criteria and by searching through more information than is available via standard EPGs.

Both EPGs and Internet browsers, however, lack functionality that is essential for effective management of the information returned by searches. One of the functions lacking, particularly in EPGs, is an ability to retrieve prior search results. In most EPGs, every time a new search is performed, information identified in any previous searches is overwritten. Overwriting the previous search information forces users to perform repeated, sometimes unnecessary, searches for information that they had previously identified. Internet browsers, on the other hand, usually allow users to return to previously visited pages. However, if a user inadvertently exits the sequential forward/back process in these browsers and jumps immediately to a web page in the history list, some previous search results become inaccessible, and just as in the case of EPGs, users may be forced to perform additional searches to find information that they had already identified.

Another function that is frequently lacking in EPGs and Internet browsers is the ability to find content information across a plurality of content information sources and content types. EPGs are generally designed to find broadcast media content, while Internet browsers are designed to find content available on the worldwide web. Due to the nature of their design, most current Internet browsers cannot function efficiently as EPGs, while most EPGs cannot function at all as Internet browsers.

Another characteristic that Internet browsers and EPGs do not possess, and yet is required for a search mechanism to be efficient, is the ability to maintain search results in an organized and easily accessible manner. As mentioned earlier, EPGs generally do not allow users to backtrack and retrieve information from previous searches. Most Internet browsers, however, usually allow users to backtrack to previous information through some form of sequential forward/back navigation mechanism augmented by the ability to jump directly to web sites already visited. Unfortunately, every time a user visits a location, a new entry is created in the browser's history list regardless of whether the user has previously visited that location or not. The end result is an unorganized history list populated with multiple copies of identical information. The unorganized way in which Internet browsers typically maintain their history lists gives rise to unnecessary confusion on the part of the user and inefficient handling of prior search results.

Therefore, what is needed is a method, system, signal, and software for maintaining search results in an easy-to-use, organized manner. Such an invention would prevent search results from being removed from a history list when subsequent searches were performed, prevent multiple entries into a history list regardless of how many times users access the original information, and provide the ability to search across a plurality of content sources of one or more content types.

SUMMARY OF THE INVENTION

Accordingly, the present invention provides a method comprising the actions of maintaining a page index including items corresponding to pages of information, searching for at least one additional page of information from any page of information from the pages of information, updating the page index to include an additional item corresponding to the additional page of information resulting from the searching action, and retaining, in the page index, the items corresponding to the pages of information independent of the searching and updating actions.

In addition, the present invention provides a computer readable medium tangibly embodying a program of instructions configured to maintain a page index including items corresponding to pages of information, search for at least one additional page of information from any page of information from the pages of information, update the page index to include an additional item corresponding to the additional page of information resulting from the search, and retain, in the page index, the items corresponding to the pages of information independent of searching and updating.

In addition, the present invention provides a signal embedded in a propagation medium comprising at least one instruction configured to maintain a page index including items corresponding to pages of information, at least one instruction configured to search for at least one additional page of information from any page of information from the pages of information, at least one instruction configured to update the page index to include an additional item corresponding to the additional page of information resulting from the search, and at least one instruction configured to retain, in the page index, the items corresponding to the pages of information independent of searching and updating.

In addition, the present invention provides a system comprising at least one processor, memory operably associated with the processor, and a program of instructions configured to be executed by the processor and stored in the memory. The program of instructions is configured to maintain a page index including items corresponding to pages of information, search for at least one additional page of information from any page of information from the pages of information, update the page index to include an additional item corresponding to the additional page of information resulting from the search, and at least one instruction configured to retain, in the page index, the items corresponding to the pages of information independent of searching and updating.

It is an object of the present invention to provide a method, system, signal, and software for handling search results that allows users to easily access any search results and perform subsequent searches without destroying previous search results.

An advantage of the present invention is that it supports searches for available content information across a plurality of content information sources of one or more content types.

A further advantage of the present invention is that neither search results pages nor entries in the page index are destroyed as a result of subsequent searches.

Another advantage of the present invention is that no duplicate entries are made in a page index when identical results are returned by searches or when a page is accessed multiple times.

BRIEF DESCRIPTION OF THE DRAWINGS

Other objects, advantages, features and characteristics of the present invention, as well as methods, operation and functions of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

FIG. 8 further illustrates handling of search results according to the preferred embodiment of the present invention.

DETAILED DESCRIPTION OF A PREFERRED EMBODIMENT OF THE INVENTION

In the following detailed description of the preferred embodiments, reference is made to the accompanying drawings which form a part hereof, and in which is shown by way of illustration specific preferred embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. The following detailed description is, therefore, not to be taken in a limiting sense, and the scope of the present invention is defined only by the appended claims.

Figure 1:
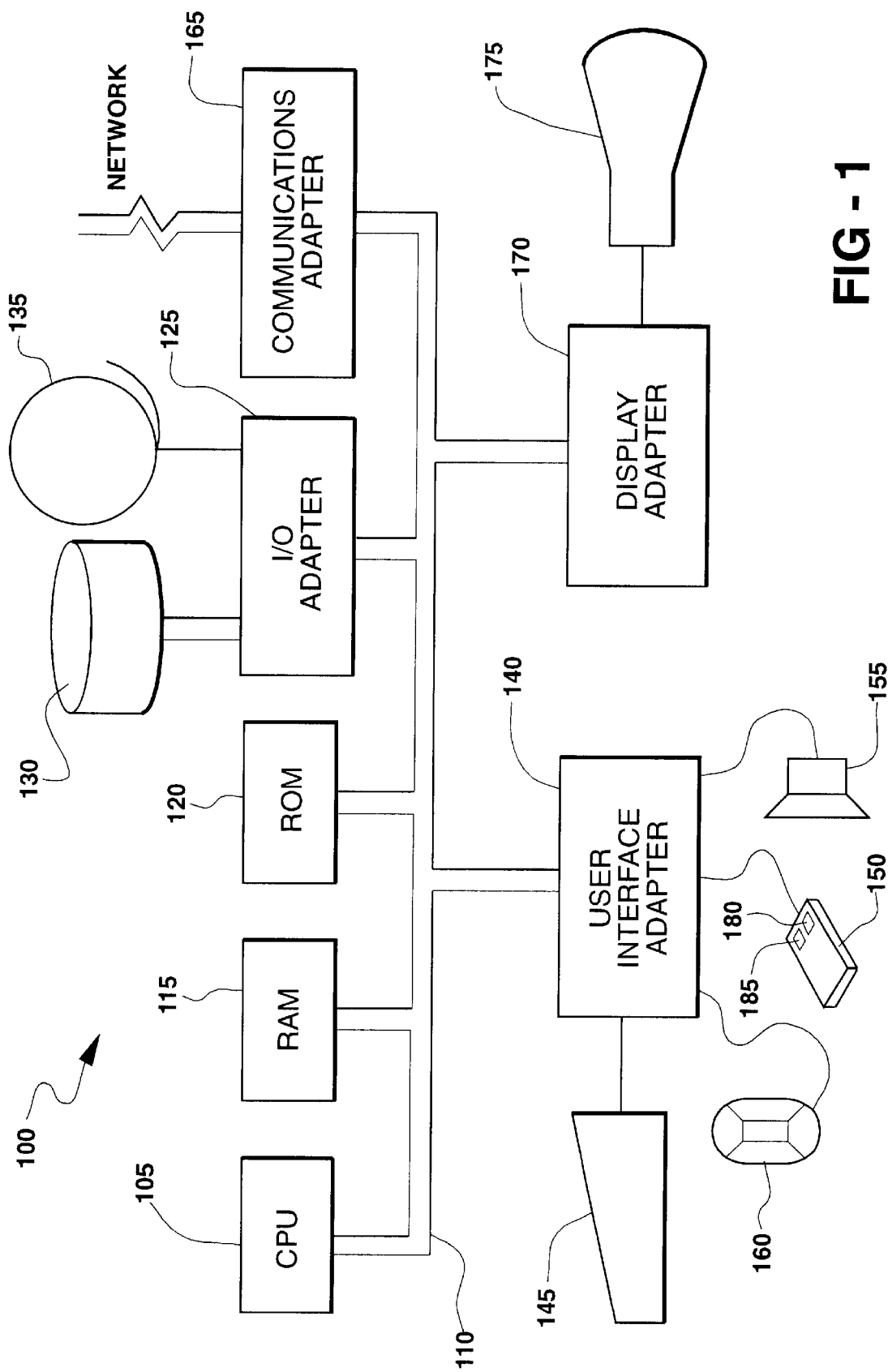
FIG. 1 illustrates a detailed block diagram showing a computer system according to a preferred embodiment of the present invention.

A representative hardware environment for practicing the present invention is depicted in FIG. 1 which illustrates a typical hardware configuration of an information handling system 100 in accordance with the present invention, having a central processing unit 105 such as a conventional microprocessor and a number of other units interconnected via at least one system bus 110. Information handling system 100 may be, for example, a portable or desktop Gateway computer or a Gateway Destination system (Gateway and Destination are trademarks of Gateway 2000, Inc.). Information handling system 100 shown in FIG. 1 includes random access memory (RAM) 115, read-only memory (ROM 120 wherein the ROM 120 could also be erasable programmable read-only memory (EPROM) or electrically erasable programmable read-only memory (EEPROM), and input/output (I/O) adapter 125 for connecting peripheral devices such as disk units 130 and tape drives 135 to system bus 110, a user interface adapter 140 for connecting keyboard 145, mouse 150, speaker 155, microphone 160, and/or other user interface devices to system bus 110, communications adapter 165 for connecting information handling system 100 to an information network such as the Internet, and display adapter 170 for connecting system bus 110 to a display device such as monitor 175. Mouse 150 has a series of buttons 180, 185 and is used to control a cursor shown on monitor 175.

Figure 2:
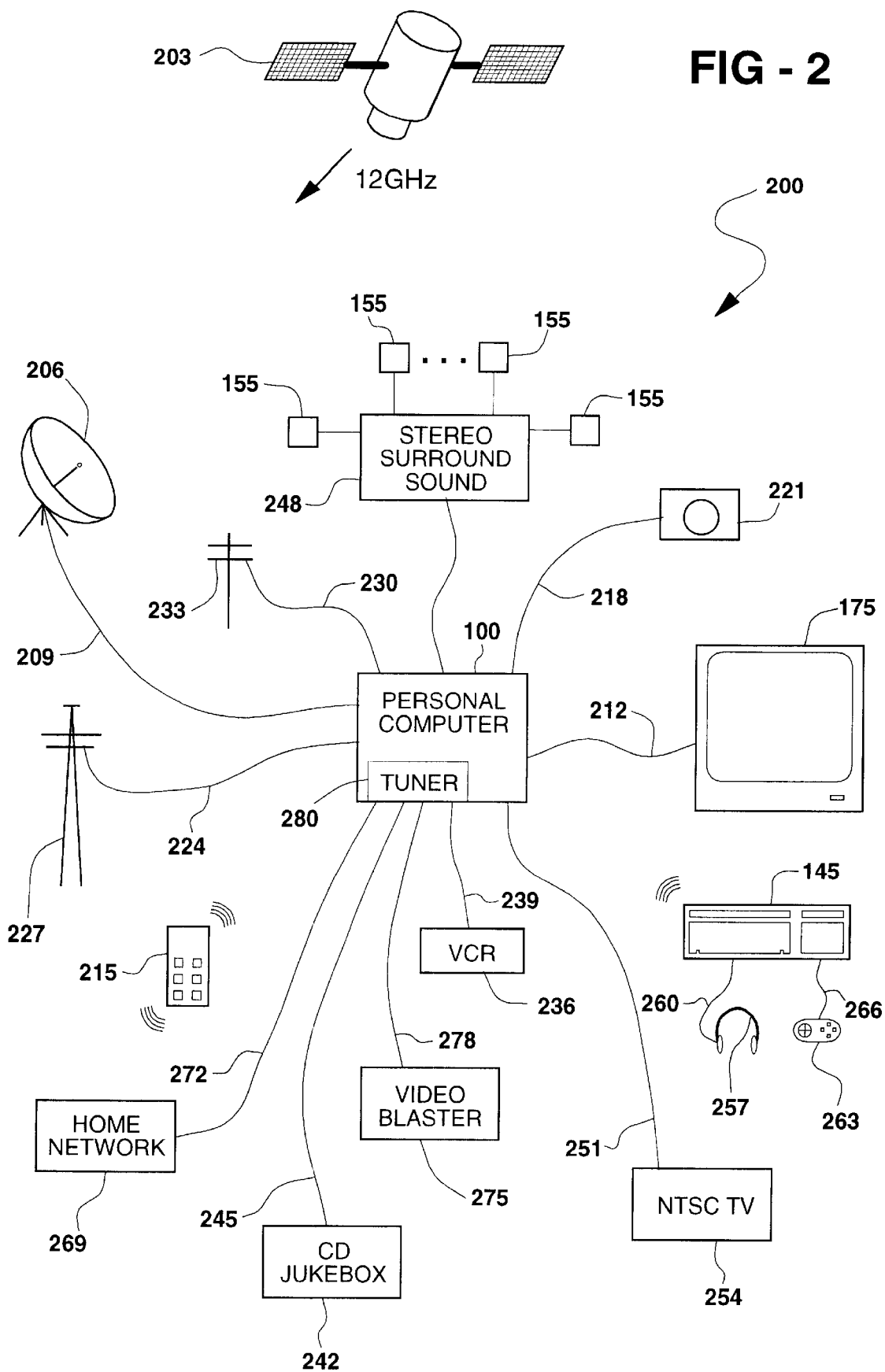
FIG. 2 illustrates a detailed block diagram showing a convergence system according to the preferred embodiment of the present invention.

Referring next to FIG. 2, a system 200 is shown in general detail. Reference numerals or letters in FIG. 2 which are like, similar, or identical to the reference numerals or letters of FIG. 1 indicate like, similar, or identical components or features. External to system 200 is satellite 203 which in one preferred embodiment is a HS601 model operated by Hughes at a 101 degree west longitude geosynchronous orbital location. Satellite 203 transmits signals comprising 150 channels of modulated digital video, audio, and data at a frequency of about 12 Ghz. The satellite signals are received by system 200 by antenna 206 containing a low noise block converter amplifier. Antenna 206 is preferably about 18 inches in diameter and receives left-hand and right-hand circularly polarized signals between 12.2 and 12.7 Ghz. Antenna 206 provides a "down converted-spectrum" signal between 950 and 1450 MHZ via a coaxial cable or other suitable communication medium 209 to information handling system 100, such as a personal computer or other system or circuitry capable of processing data. Suitable antennas 206 are already being manufactured and sold by RCA corporation by direct sales and through numerous major retail chains such as Radio Shack.

System 100 contains circuitry and software to further process signals from the antenna, generally demodulating and decoding the signal to produce a VGA (video graphics adapter) signal. The VGA signal is provided via standard VGA compatible monitor cable 212 to drive large screen data quality monitor 175 suitable for viewing in a family room or entertainment room environment. System 100 provides for user input by means of remote controls 215 and 145. Remote control 215 comprises a hand-held size device with standard television controls and a numeric keypad and, in one embodiment, video cassette recorder (VCR) controls and a pointing device. It provides radio frequency (RF) or infrared (IR) control signals received by system 100. Remote control 145 is a full function personal computer keyboard with additional standard television and VCR controls, a pointing device which is preferably in the form of a touchpad, and it also provides RF control signals to system 100. RF control signals were selected over IR or hardwired in one embodiment due to the home entertainment environment. Monitor cable 212 is a standard type cable typically used on VGA display devices and comprises up to 15 electrical conductors interfacing with monitor 175 in a D-series shell connector. In one embodiment, full multimedia sourcing and destinationing of audio/video/data (A/V/D) broadcast are provided for. Although the embodiment presented herein discusses the use of VGA signals, it should be mentioned that with an appropriate change in hardware, National Television Standard Committee (NTSC) compliant signals and NTSC compliant hardware will employ the present invention in the manner mentioned herein.

Information handling system 100 may include a tuner, tuner circuitry 280, or card capable of both tuning to multiple channels and receiving television information or signals in the form of the NTSC or Phase Alteration Line (PAL) form from any medium 116 carrying signals from satellite dish 206 which provides digital A/V/D signals from such sources as DirecTV or Primestar (DirecTV is a trademark of DirecTV, Inc., and Primestar is a trademark of Primestar Partners, L.P.). In another such embodiment, the signals carried on medium 209 provide analog A/V such as NTSC antenna signals. In another such embodiment, the signal carried on medium 218 from camera 221 provides analog A/V such as NTSC audio/video signals. In further embodiments, the signal carried on medium 224 from cable-data source 227 provides analog and/or digital A/V/D. In further such embodiments, the signal carried on medium 230 from Public Switched Telephone Network (PSTN) 233 provides data or phone signals such as integrated services digital network (ISDN) or plain old telephone system (POTS) signals. In one set of such embodiments, system 100 is programmed to automatically record analog signals such as television programming onto recordable media such as a video tape in VCR 236 coupled to cable 239. In another such set of embodiments, system 100 is programmed to automatically record digital signals such as digital television programming, Digital Versatile Disk (DVD) programming, or compact disk read-only memory (CD-ROM) type audio onto recordable media such as recordable compact disks in CD/DVD jukebox 242 coupled to cable 245. CD/DVD jukebox 242 also plays CDS, CD-ROMs or DVDs for use elsewhere. In another such embodiment, signals are sent to stereo surround system 248 for audio output to one or more speakers 155 and on cable 251 to TV 254. In one such embodiment, earphones 257 on cable 260 and game pad 263 on cable 266 provide additional input/output through remote control 145. Home network 269 is "smart wiring" used to transmit data and control within the home, coupled by cable 272 to system 100. Videoblaster 275 provides video signal processing on cable/connector 278. Cables 224, 209, 230, 218, 251, 239, 278, 245, 260, and 153 can be wired coupling or wireless, such as RF or IR.

One example of convergence system 200 is the Destination System using the DestiVu user or media interface manufactured and sold by Gateway 2000, Inc. In this manner, convergence system 200 is a fully functional computer integrated with a television, providing TV viewing (via broadcast, cable, satellite, VCR, digital disk, or other broadcast media) and personal computing functionality. This convergence of computer and television enables a user combined access to both television programs and information and computer related functionality such as computer information and programs and Internet access.

Although many of today's televisions employ many of the same hardware resources employed by computers such as information handling system 100, it is possible that the present invention might be practiced in other electronic devices or networked electronic devices. For example, with the development of audio/video networking such as the recently proposed HAVi standard, television sets or other audio/video devices such as audio/video receivers and VCRs that do not themselves contain such resources could implement the present invention by using the resources of other devices on a network.

Figure 3:
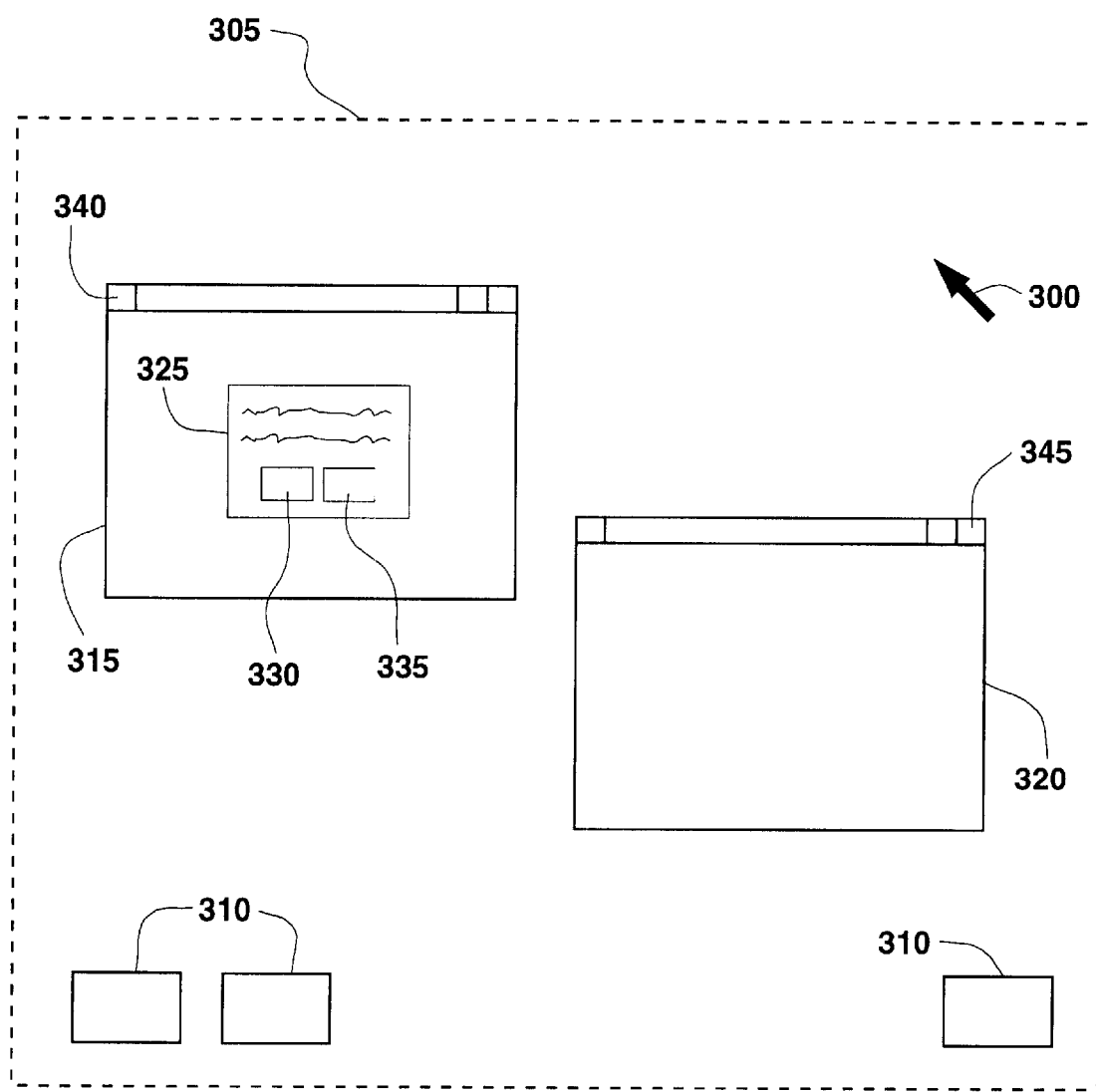
FIG. 3 shows the desktop of a computer operating system's user interface typically employed on a computer system as in FIGS. 1 and 2, according to the preferred embodiment of the present invention.

Referring next to FIG. 3, a detail of an operating system's graphical user interface, or GUI as is typically displayed on monitor 175 in accordance with the present invention is illustrated. Reference numerals or letters in FIG. 3 which are like, similar, or identical to the reference numerals or letters of FIGS. 1–2 indicate like, similar, or identical components or features. The operating system shown in FIG. 3 is IBMs OS/2 (OS/2 is a trademark of International Business Machines Corporation); however, the present invention will work with DestiVu, Windows 98, Windows 95 (DestiVu is a trademark of Gateway 2000 Inc. and Windows 98 and Windows 95 are trademarks of Microsoft Corporation), or any other graphical user interface. This GUI includes cursor 300, desktop 305, three icons 310, two windows 315, 320, and dialog box 325, all of which are well known in the art. Dialog box 325 further contains two buttons 330, 335. Programs are represented by the graphical user interface as either icons 310 or windows 315, 320. The horizontal region along the top of a window is called the "title bar" 340, 345. A program window 315, 320 has the "focus" when it has been designated by the user or by the operating system to receive input from keyboard 145 or mouse 150. In OS/2®, the user gives the window focus by clicking a mouse button 180, 185 when cursor 300 is inside that window. Some operating systems, however, give a window the focus merely whenever cursor 300 is present within that window. The operating system indicates which program has the focus by changing the color of the focused window's title bar 340, 345.

Figure 4:
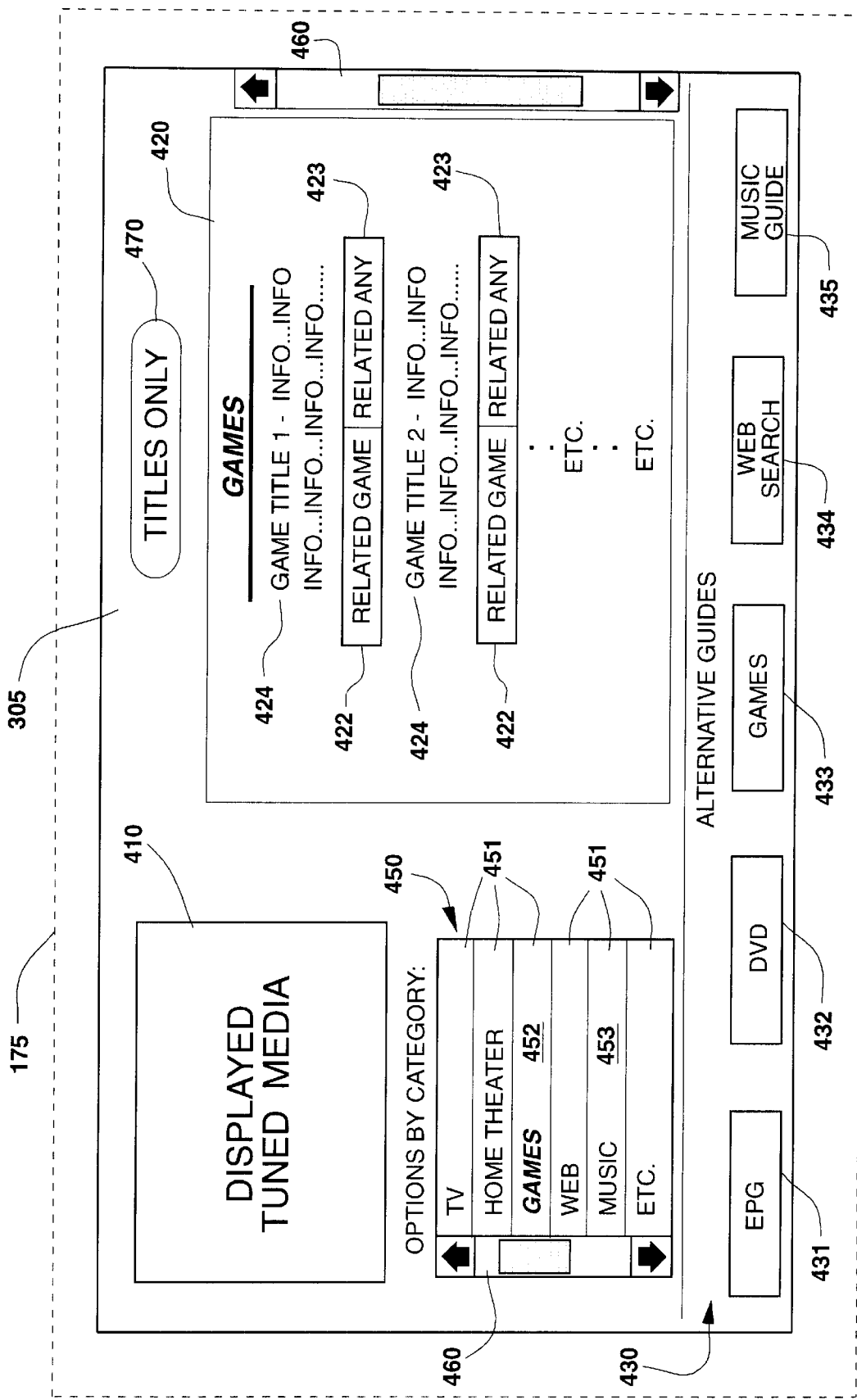
FIG. 4 illustrates a graphical user interface of the present invention prior to utilization according to the preferred embodiment.
Figure 5:
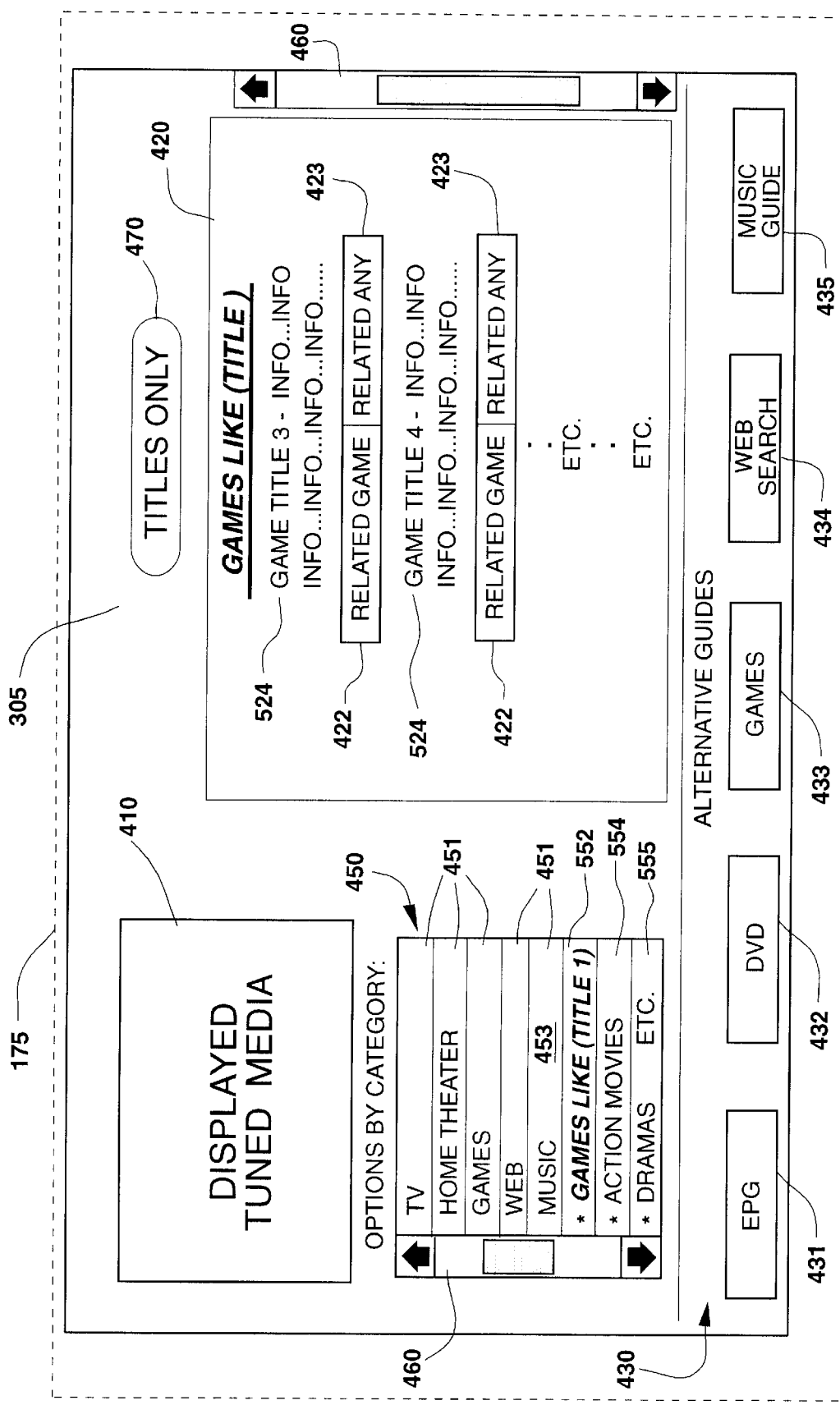
FIG. 5 illustrates a graphical user interface of the preferred embodiment of the present invention after a search has been initiated.

A system for implementing the preferred embodiment of the present invention has been described in the previous paragraphs. A user interface practiced by the preferred embodiment of the present invention as illustrated in FIGS. 4 and 5 is described next. Reference numerals or letters in FIGS. 4 and 5 which are like, similar, or identical to the reference numerals or letters of FIGS. 1–3 indicate like, similar, or identical components or features.

Referring first to FIG. 4, a graphical user interface of the present invention is illustrated. There are five basic display areas implemented by the present invention, 410, 420, 430, 450, 470. The first area 410 to be discussed is used for displaying tuned media content. Tuned media display are a 410 uses the entire available display area 305 when no other objects are displayed. This means that when a user is viewing tuned media content, for instance a broadcast television program, and not displaying any search or program information, the tuned media content is viewed at full size. If, however, a user decides that he wants to access information relating to a program he is viewing or if he wishes to conduct a search for another program, then tuned media viewing area 410 is scaled to take up only a portion of the screen, thereby allowing other areas generated by the present invention 420, 430, 450, 470 to be displayed. Tuned media display area 410 is not restricted to displaying only broadcast media streams; it can also display media of other types or from other sources, for example, Internet information, cable television programs, satellite programs, or even a pre-recorded video cassette or DVD programs.

Still referring to FIG. 4, the next display area to be discussed is page index display area 450. Page index display area 450 consists of user-selectable objects 451 that are linked to pages of information maintained in a page index. In one embodiment of the present invention, the page index initially includes links 451 to a TV page, a home theater page, a games page, a web page, and a music page. These default pages contain information determined to be of probable user interest from user preferences and habits. As an example of how user preferences could be entered into category pages, suppose that a user enjoys listening to a local country music station KTRY, a rock music station KROK, and an easy listening station KEZZ. In one embodiment of the present invention, users can conduct searches for available radio stations using one of the search mechanisms 431, 432, 433, 434, 435, accessible through the present invention's user interface. A list of available radio stations is then displayed in search results area 420. Once a list is displayed, a user can select which stations to add to the music page, thereby creating a list of favorite radio stations. From then on, whenever the user selects the music page 453, his favorite radio stations, KTRY, KROK, and KEZZ, will be displayed in the search results area 420. Similar methods can be used to store information in the other category guides 451. In the preferred method of the present invention, a user can select which category guides are initially displayed when the system is started.

Referring to FIG. 5, in addition to the default category guides 451 displayed each time the graphical user interface 305 of the present invention is initialized, page links 552, 554, 555 are added to the page index every time a search which returns unique results is performed. For example, suppose a user is looking for something to watch on television, and the user initiates a search for action movies currently showing, using the EPG button 431. Only two action movies are returned by the search, and the user is not interested. The user next initiates a search for dramas currently showing. Four dramas are returned as a result of the search, and a new entry 555 is made in the page index, but again the user is not interested. If the user changes his mind and decides to go back and see what action movies are showing, he does not need to initiate another search using the EPG button. Instead, he can simply go to the page index area 450, as illustrated in FIG. 5, and click on the link 554 to display the results of his previous search for action movies. Neither the page index nor the search results pages are reset as a result of a subsequent search, but instead the search results pages are stored and the page index is expanded with each new search until either the user discards the search results or the user terminates the session. If there are too many links to be displayed on the screen in the area provided, scroll bar 460 is generated allowing the user to easily move through the list 450 of indexed pages.

Refer again to FIG. 4 for a discussion of search results display area 420. As mentioned in the previous paragraph, search results area 420 displays information returned from searches initiated through one of the present inventions search mechanisms 422, 423, 431, 432, 433, 434, 435, 451. Options 422, 423 will be detailed at a later time. The search results are displayed in a hyperlink format that allows a user to select an item for immediate consumption simply by clicking on displayed object 424. In the preferred embodiment of the present invention, displayed object 424 is the name of a program returned as a result of a search, but the object can take other forms such as a button or icon of some sort. Below each item returned as a result of a search, the present invention implements two other linked objects 422, 423. These objects, which can take the form of user-selectable buttons, allow users to easily initiate a search for available media content related to displayed object 424. Button 422 is linked to a search routine for finding similar content only within the same media category as a displayed item. Button 423 is linked to a search engine that returns related content items regardless of what content category those items are in. For example, suppose a user has selected games search item 452 from page index area 450. The present invention has returned a list of two games 424 displayed in area 420 that the user has stored in the games page, for example, Monopoly and Risk. Below each of the game titles 424, two user-selectable objects 422, 423 linked to search engines are displayed. One object 422, if selected, would initiate a search for similar items within the games category, while the other object 423, if selected, would initiate a search for similar content across a plurality of content information sources of a plurality of types. Suppose, for instance, that the user is considering the game of Risk. If the user were to select search mechanism 422 to return games similar to Risk, the present invention may return the game of chess, but it would not return information on a news broadcast covering Bobby Fischer. However, if the user had selected object 423 that initiates the search for related items regardless of the content type or category, then not only would the game of chess be returned but so would the news article about Bobby Fischer. The present invention may also return an Internet address relating to chess, such as www.chess.com. If either of these two searches 422, 423 were to be performed, the present invention as illustrated in FIG. 5 would add a page link 552 in the page index area 450. Adding a link 552, 554, 555 for each search which returns unique results allows users to back-track easily and quickly find desired media content.

The next area to be discussed, area 430, is provided in the preferred embodiment of the present invention to display user-selectable objects 431, 432, 433, 434, 435 linking to information selection mechanisms, including alternate media guides 431,435 and search engines 432, 433, 434. These links are provided in anticipation of a user not wanting to use the pre-defined categories 451 provided by the present invention. For instance, object 431 may link to an EPG provided by a local cable company, and object 434 may link to a web browser or possibly an Internet search engine.

Providing a page index 450 and related-item search links 422, 423 allows basic users, or users unfamiliar with advanced navigation techniques, to easily find content across many kinds of media, while the links to alternate guides 431, 435 and search mechanisms 432, 433, 434 allow advanced users, or those more comfortable searching detailed guides, to search in any manner they prefer.

The final display item is a display options button 470 that allows users to control the amount of detail included in the displayed information. In the preferred embodiment of the present invention, display options button 470 is designed to toggle between a verbose mode, which displays a great deal of information in area 420 about programs identified during a search and a mode which displays only a program's title 424.

Each of the display areas discussed must have some initial, or default, state to use when system 100 implementing the present invention is initially powered on or when a new user session is started. The initial state can be dictated by a user's direct input, as described earlier, but the preferred embodiment of the present invention provides for the initial state of tuned media display area 410, page index display area 450, and search results display area 420 to include items of probable user interest determined from user preferences and habits. The preferred embodiment of the present invention will display, in tuned media viewing area 410, whatever is being currently viewed when the user interface is invoked. In another embodiment of the present invention, when system 100 of the present invention is initially started, it will display whatever channel was being viewed at the end of the last session, whether the channel was an Internet browser, a game, or a television show. In one embodiment of the present invention, the channel displayed may be whatever channel the system is normally tuned to at that time of day, based upon some pattern found by examining information associated with user preferences and habits. The search results area 420 could, in the preferred embodiment of the present invention, initially display the contents of a game page 452 if an analysis of user preferences and habits indicates that this particular user normally plays chess at 5:00 p.m. If there were no clear usage pattern or if directed by the user, the system could display information included in a TV category 451 page index. In the preferred method of the present invention, page index area 450 would initially contain default category pages 451 defined by the user. However, if a clear pattern of, for example, using an Internet browser to search for news articles were indicated by a system usage analysis, a link to a category page 451 containing the users favorite news locations could be displayed.

Figure 6:
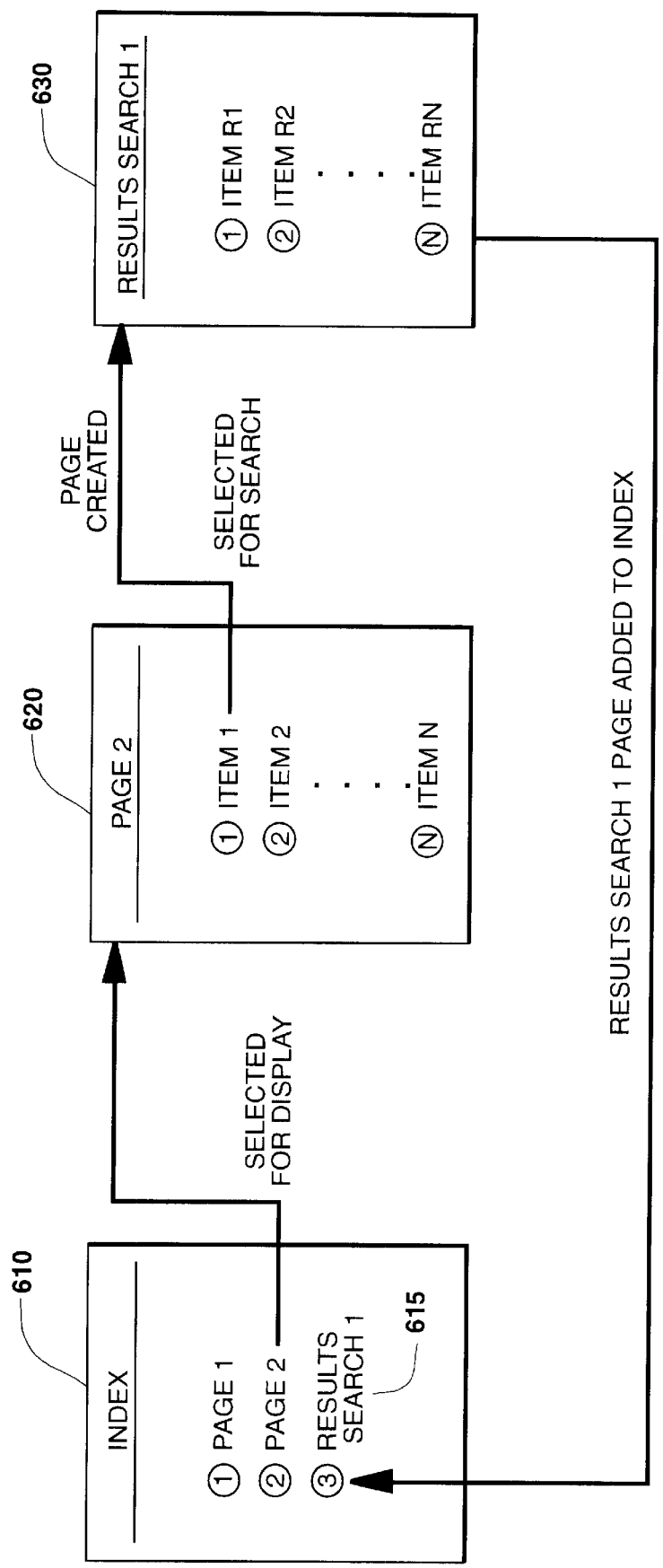
FIG. 6 illustrates a sequence of steps employed by the preferred embodiment of the present invention to add entries to the page index.
Figure 7:
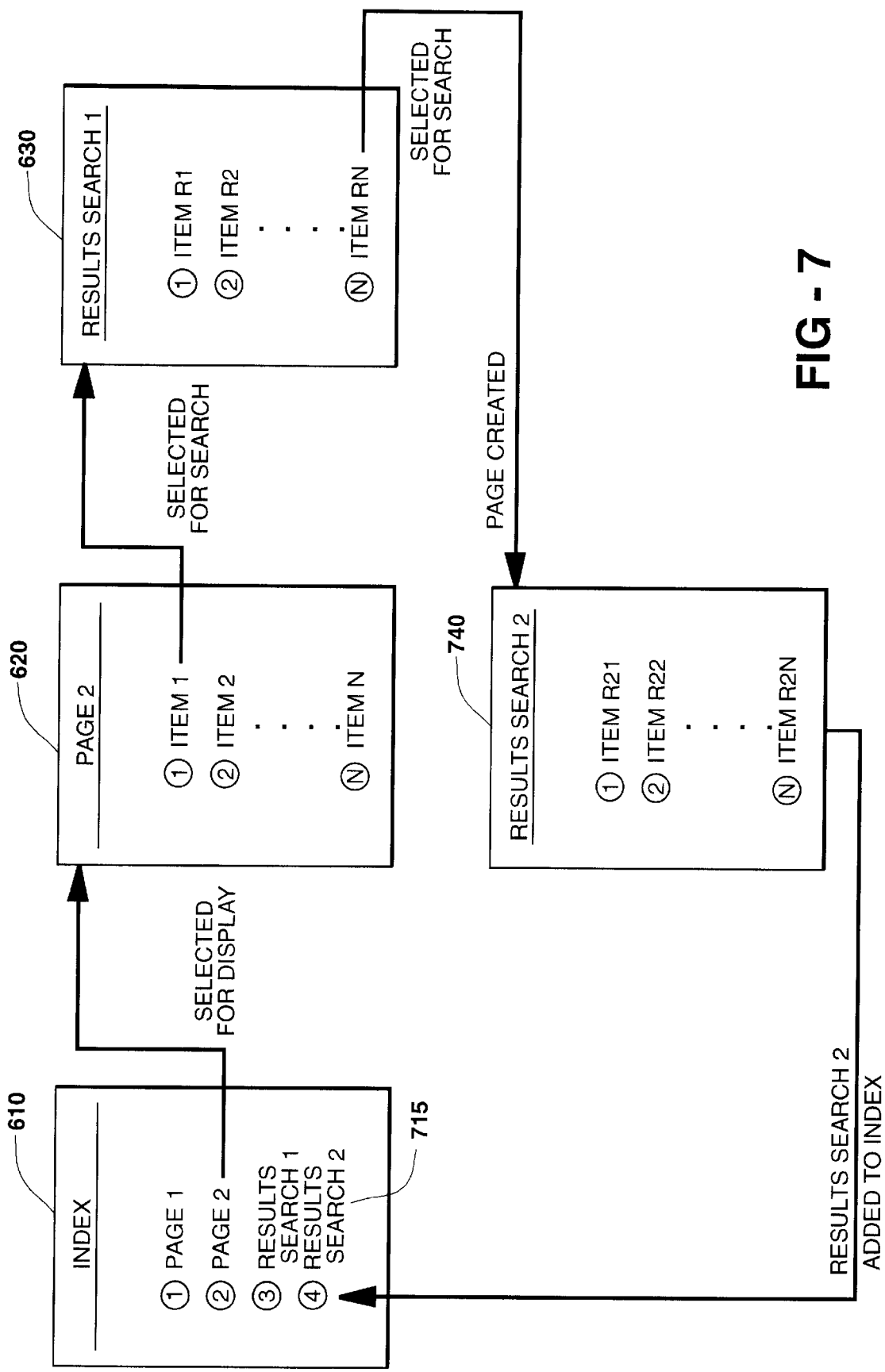
FIG. 7 illustrates how subsequent search results are handled according to the preferred embodiment of the present invention.

Having explained the GUI of the preferred method of the present invention, refer to FIGS. 6–8 for an illustration of the states of the page index resulting from various search scenarios according to the preferred embodiment of the present invention. Reference numerals or letters in FIGS. 6–8 which are like, similar, or identical to the reference numerals or letters of FIGS. 1–5 indicate like, similar, or identical components or features.

Referring now to FIGS. 4, 6, and 7, the following is an explanation of how search results are handled in the preferred method of the present invention. The initial state of page index 610 holds pointers to page 1 and page 2. When page 2 is selected by a user, the contents 620 of page 2 are displayed in a search results area 420 with two associated objects 422, 423 for initiating subsequent searches. When one of the search mechanisms 422, 423 is selected, the results 630 of that search are displayed in place of the contents of page 2, and a new entry 615 is made in the page index 610. Referring next to FIGS. 4 and 7, assume that a further search is initiated when a user selects a search item 422, 423 associated with item Rn displayed in the search results area. Results 740 of the second search are now displayed in place of the first search's results 630, and a new page 715 is added to the page index 610. Note that no pages 620, 630, 740 or entries in the page index 610 have been destroyed.

Referring now to FIGS. 4 and 8, the user selects from page index 610, page 615 containing results 630 of the first search performed, causing results 630 of the first search to be displayed in search results area 420. Note that the search is not performed a second time, nor has another entry been added to page index 610. The user then selects an item associated with item R2n from the search results display 420, thereby initiating a third search. The results 850 of the third search are now displayed in search results display area 420, and a new entry 815 is added to page index 610.

No pages of information 620, 630, 740, 850, or entries in the page index 610 are destroyed unless directed by the user or upon termination of a user's session. An alternate embodiment of the present invention provides users the option of saving the page index and any search results pages generated in a particular session to a file for use in a subsequent session. When the saved searches are recalled, they will be displayed in the page index area 610 in much the same way as the default pages discussed earlier. Also, no matter how many times a user returns to the same search results, whether by selecting a page from the page index or as a result of a search that returns identical information, only one entry is made in the page index 610.

Despite the fact that the preferred embodiment of the present invention is implemented as described above, the present invention can also be realized completely within an Internet browser having access only to Internet data. Alternatively, it could be realized within an EPG dealing only with broadcast data. The present invention could also be used in applications far removed from searches relating to media content, inasmuch as the application employing the present invention required a method of handling search results in a systematic, easy to use, organized manner.

Although an embodiment of the present invention has been shown and described in detail herein, along with certain variants thereof, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention.

Although the invention has been described with a certain degree of particularity, it should be recognized that elements thereof may be altered by persons skilled in the art without departing from the spirit and scope of the invention. One of the preferred implementations of the invention is as sets of instructions resident in the random access memory 115 of one or more computer or information handling systems configured generally as described in FIGS. 1–8. Until required by the computer system, the set of instructions may be stored in another computer readable memory, for example, in a hard disk drive or in a removable memory such as an optical disk for eventual use in a CD-ROM drive or a floppy disk for eventual use in a floppy disk drive. Further, the set of instructions can be stored in the memory of another computer and transmitted over a local area network or a wide area network, such as the Internet, where the transmitted signal could be a signal propagated through a medium such as an ISDN line, or the signal may be propagated through an air medium and received by a local satellite whereupon being transferred to the computer or information handling system of the preferred embodiment where the signal is a composite signal comprising a carrier signal, and contained within the carrier signal is the desired information containing at least one computer program instruction implementing the invention and may be downloaded as such when desired by the user. One skilled in the art would appreciate that the physical storage and/or transfer of the sets of instructions physically changes the medium upon which it is stored electrically, magnetically, or chemically so that the medium carries computer readable information. The invention is limited only by the following claims and their equivalents.

What is claimed is:

1. A method of electronically searching at least one content source, the content source including multiple data entries adapted to be searched, the method comprising the following actions:

maintaining a page index including items corresponding to pages of information;

performing a user-initiated search of the content source according to search criteria;

obtaining a listing of search results if any of the data entries meet the search criteria:

generating a new item corresponding to the listing of search results;

updating the page index to include the new item corresponding to the listing of search results; and retaining, in the page index, the new item and the items corresponding to the pages of information independent of whether additional searches are performed.

2. The method of claim 1, further comprising the action of performing at least one additional user-initiated search to obtain an additional listing of search results and generating an additional item corresponding to the search results listing; wherein said updating action comprises updating the page index to include the additional item if the corresponding additional listing does not duplicate a previously obtained listing.

3. The method of claim 1, further comprising the actions of displaying the page of information providing the displayed page of information with user-selectable objects related to the page of information, and wherein the action of performing the search is initiated in response to selection of one of the user-selectable objects.

4. The method of claim 1 further comprising the action of continuously displaying the page index on a display.

5. The method of claim 1 wherein the page index initially comprises items corresponding to pages of information of probable user interest identified from user preferences and habits.

6. The method of claim 1 further comprising the action of providing access to at least two content sources adapted to be electronically searched, the sources selected from the group consisting of an electronic program guide, a DVD library, a games library, the World Wide Web, a music guide, and a personal computer.

7. The method of claim 6 wherein said maintaining, searching, updating and retaining actions are performed during a search session.

8. The method of claim 7 further comprising the action of storing the page index, pages of information, and any additional pages of information after the search session.

9. The method of claim 1 for searching at least two content sources, wherein the action of performing the search comprises actuating a search mechanism corresponding to a selected one of the content sources.

10. The method of claim 1 for searching multiple content sources, wherein the action of performing the search comprises actuating a single search mechanism corresponding to the multiple content sources, and wherein the action of obtaining the listing comprises obtaining a listing of any data items meeting the search criteria from the multiple content sources.

11. A computer readable medium tangibly embodying a program of instructions, said program of instructions configured to:

maintain a page index including items corresponding to pages of information;

perform a user-initiated search of a content source according to search criteria;

obtain a listing of search results if any data entries meet the search criteria;

generate a new item corresponding to the listing of search results;

update the page index to include the new item corresponding to the listing of search results; and retain, in the page index, the new item and the items corresponding to the pages of information independent of whether additional searches are performed.

12. The computer readable medium of claim 11, wherein said program of instructions is further configured to perform at least one additional user-initiated search to obtain an additional listing of search results and generate an additional item corresponding to the additional listing of search results and to update the page index to include the additional item if the corresponding additional listing does not duplicate the listing obtained previously.

13. The computer readable medium of claim 11, wherein said program of instructions is further configured to display the pages of information, provide the displayed pages of information with user-selectable objects related to the pages of information, and wherein the performance of the user-initiated search is initiated in response to selection of one of the user-selectable objects.

14. The computer readable medium of claim 11 wherein said program of instructions is further configured to continuously display the page index on a display.

15. The computer readable medium of claim 11 wherein the page index initially comprises items corresponding to pages of information of probable user interest identified from user preferences and habits.

16. The computer readable medium of claim 11 wherein said program of instructions is further configured to provide access to at least two content sources adapted to be electronically searched the sources selected from the group consisting of an electronic program guide, a DVD library, a games library, the World Wide Web, a music guide, and a personal computer.

17. The computer readable medium of claim 16 wherein maintaining, searching, and updating are performed during a search session.

18. The computer readable medium of claim 17 wherein said program of instructions is further configured to store the updated page index, pages of information, and any additional pages of information after the search session.

19. A signal embedded in a propagation medium comprising:
    at least one instruction configured to maintain a page index including items corresponding to pages of information;
    at least one instruction configured to perform a user-initiated search of a content source according to search criteria;
    at least one instruction configured to obtain a listing of search results if any data entries meet the search criteria;
    at least one instruction configured to generate a new item corresponding to the listing of search results;
    at least one instruction configured to update the page index to include the new item corresponding to the listing of search results; and
    at least one instruction configured to retain, in the page index, the new item and the items corresponding to the pages of information independent of whether additional searches are performed.

20. The signal of claim 19 further comprising at least one instruction configured to perform at least one additional user-initiated search to obtain an additional listing of search results and generate an additional item corresponding to the listing of search results; wherein said at least one instruction is configured to update the page index to include the additional item if the corresponding additional listing does not duplicate the listing obtained previously.

21. The signal of claim 19 further comprising at least one instruction configured to display the page of information, provide the displayed page of information with user-selectable objects related to the page of information, and wherein the performance of the user-initiated search is initiated in response to selection of one of the user-selectable objects.

22. The signal of claim 19 further comprising at least one instruction configured to continuously display the page index on a display.

23. The signal of claim 19 wherein the page index initially comprises items corresponding to pages of information of probable user interest identified from user preferences and habits.

24. The signal of claim 19 further comprising at least one instruction configured to provide access to at least two content sources adapted to be electronically searched, the sources selected from the group consisting of an electronic program guide, a DVD library, a games library, the World Wide Web, a music guide, and a personal computer.

25. The signal of claim 24 wherein maintaining, searching, and updating are performed during a search session.

26. The signal of claim 25 further comprising at least one instruction configured to store the updated page index, pages of information, and any additional pages of information after the search session.

27. A system comprising:
    at least one processor;
    memory operably associated with said processor; and
    a program of instructions configured to be executed by said processor and stored in said memory, said program of instructions configured to maintain a page index including items corresponding to pages of information,
        perform a user-initiated search of a content source according to search criteria,
        obtain a listing of search results if any data entries meet the search criteria,
        generate a new item corresponding to the listing of search results,
        update the page index to include the new item corresponding to the listing of search results, and
        at least one instruction configured to retain, in the page index, the new items and the items corresponding to the pages of information independent of whether additional searches are performed.

28. The system of claim 27 wherein said program of instructions is further configured to perform at least one additional user-initiated search to obtain an additional listing of search results and generate an additional item corresponding to the listing of search results; wherein said program of instructions configured to update the page index to include the additional item if the corresponding additional listing does not duplicate the listing obtained previously.

29. The system of claim 27 wherein said program of instructions is further configured to display the pages of information, provide the displayed pages of information with user-selectable objects related to the pages of information, and wherein the performance of the user-initiated search is initiated in response to selection of one of the user-selectable objects.

30. The system of claim 27 wherein said program of instructions is further configured to continuously display the page index on a display.

31. The system of claim 27 wherein the page index initially comprises items corresponding to pages of information of probable user interest identified from user preferences and habits.

32. The system of claim 27 wherein said program of instructions is further configured to provide access to at least two content sources adapted to be electronically searched, the sources selected from the group consisting of an electronic program guide, a DVD library, a games library, the World Wide Web, a music guide, and a personal computer.

33. The system of claim 32 wherein maintaining, searching, and updating are performed during a search session.

34. The system of claim 33 wherein said program of instructions is further configured to store the updated page index, pages of information, and any additional pages of information after the search session.

35. The system of claim 27, further comprising a television for viewing programs, an electronic program guide identifying at least some of the programs, and a personal computer operatively connected to the television, wherein the program of instructions is further configured to search the programs available to the system, including the electronic program guide.

\* \* \* \* \*